(12) United States Patent
Isakiewitsch

(10) Patent No.: US 9,802,498 B2
(45) Date of Patent: Oct. 31, 2017

(54) SUBFRAME FOR A MOTOR VEHICLE

(71) Applicant: AUDI AG, Ingolstadt (DE)

(72) Inventor: Christian Isakiewitsch, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/325,351

(22) PCT Filed: Jul. 2, 2015

(86) PCT No.: PCT/EP2015/001345
§ 371 (c)(1),
(2) Date: Jan. 10, 2017

(87) PCT Pub. No.: WO2016/005039
PCT Pub. Date: Jan. 14, 2016

(65) Prior Publication Data
US 2017/0166066 A1 Jun. 15, 2017

(30) Foreign Application Priority Data
Jul. 11, 2014 (DE) .................. 10 2014 010 287

(51) Int. Cl.
B60L 11/18 (2006.01)
B62D 21/15 (2006.01)
(Continued)

(52) U.S. Cl.
CPC ......... B60L 11/182 (2013.01); B60L 11/1829 (2013.01); B62D 21/155 (2013.01);
(Continued)

(58) Field of Classification Search
CPC ... B60L 11/182; B60L 11/1829; H02J 7/0042; H02J 7/7025; B62D 21/155; Y02T 10/7005; B60Y 2304/01
(Continued)

(56) References Cited

U.S. PATENT DOCUMENTS 5,390,754 A * 2/1995 Masuyama ............ B60K 1/04
105/51
6,059,058 A * 5/2000 Dower .................. B60K 1/04
180/298
(Continued)

FOREIGN PATENT DOCUMENTS

DE        40 11 962 A1   10/1990
DE   10 2009 029 883 A1  12/2010
(Continued)

OTHER PUBLICATIONS

International Search Report issued by the European Patent Office in International Application PCT/EP2015/001345.

*Primary Examiner* — Karen Beck
(74) *Attorney, Agent, or Firm* — Henry M. Feiereisen LLC

(57) ABSTRACT

A subframe of a front or rear region of a motor vehicle, includes two longitudinal members which are spaced apart from each other in a transverse direction of the motor vehicle and are connected with each other via at least one cross member; a stiffening structure for increasing a torsion stiffness of the subframe; and a charging module for contactless energy transfer, wherein the charging module is integrated in the stiffening structure, and is connected with the stiffening structure exclusively via decoupling bearings.

7 Claims, 3 Drawing Sheets

(51) Int. Cl.
*H02J 7/02* (2016.01)
*H02J 7/00* (2006.01)

(52) U.S. Cl.
CPC ............ *H02J 7/0042* (2013.01); *H02J 7/025* (2013.01); *B60Y 2304/01* (2013.01); *Y02T 10/7005* (2013.01)

(58) Field of Classification Search
USPC ........................................................ 280/784
See application file for complete search history.

(56) References Cited

U.S. PATENT DOCUMENTS

| | | | |
|---|---|---|---|
| 7,520,355 B2* | 4/2009 | Chaney | B60K 1/04 |
| | | | 180/68.5 |
| 9,120,506 B2* | 9/2015 | Isakiewitsch | B62D 21/11 |
| 9,321,323 B2 | 4/2016 | Schindler et al. | |
| 9,434,230 B2 | 9/2016 | Schmitt et al. | |
| 9,434,416 B2 | 9/2016 | Isakiewitsch et al. | |
| 9,446,653 B2 | 9/2016 | Schindler et al. | |

FOREIGN PATENT DOCUMENTS

| | | |
|---|---|---|
| DE | 10 2010 042 395 A1 | 4/2012 |
| DE | 10 2012 023 363 A1 | 6/2014 |
| EP | 0 253 345 B1 | 10/1992 |
| FR | 2 968 065 A1 | 6/2012 |
| JP | WO 2012/157333 A1 | 11/2012 |
| JP | 2012 257443 A | 12/2012 |
| JP | 2012 267443 A | 12/2012 |
| WO | WO 2012/157333 A1 | 11/2012 |

* cited by examiner

SUBFRAME FOR A MOTOR VEHICLE

CROSS-REFERENCES TO RELATED APPLICATIONS

This application is the U.S. National Stage of International Application No. PCT/EP2015/001345, filed Jul. 2, 2015, which designated the United States and has been published as International Publication No. WO 2016/005039 and which claims the priority of German Patent Application, Serial No. 10 2014 010 287.4, filed Jul. 11, 2014, pursuant to 35 U.S.C. 119(a)-(d).

BACKGROUND OF THE INVENTION

The present invention relates to a subframe for a front region or a rear region of a motor vehicle with two longitudinal members which are spaced apart from each other in vehicle transverse direction and are connected with each other by at least one cross member, wherein the subframe has a stiffening structure for increasing the torsion stiffness into which a charging module for contactless energy transfer is integrated.

In vehicle construction such subframes serve for fastening the superstructure-side connection points of a wheel suspension. Additionally an internal combustion engine, a transmission and/or a steering can be fastened, mostly on the subframe of the front region of the vehicle. The subframe itself is usually elastically connected to the vehicle body by means of rubber bearings. The stiffening structure can be configured as a shear resistant plate or as strut assembly, preferably of cross-type construction. The shear resistant plate can only increase the stiffness of the subframe while the strut assembly is capable to additionally absorb forces.

The patent document DE 10 2012 023 363 A1 describes a generic subframe of a front or rear region of a motor vehicle with two longitudinal members, which are spaced apart from each other in vehicle transverse direction and are connected with each other via at least one cross member, wherein the subframe has a stiffening structure for increasing torsion stiffness and wherein a charging module for contactless energy transfer can be integrated into the stiffening structure. The charging module has a shielding plate and a coil unit, wherein a decoupling element (internal decoupling) is arranged between the shielding plate and the coil unit.

A disadvantage is that the decoupling element between the shielding plate and the coil has to be configured with a very large area in order to ensure the effective decoupling of the coil unit on one hand and on the other hand to reliably support its weight. This places relatively high demands on manufacturability.

SUMMARY OF THE INVENTION

It is therefore an object of the invention to provide a subframe for a motor vehicle, which can be produced more easily.

The object is solved by the features of the independent patent claim.

A subframe of a front region or a rear region of a motor vehicle has two longitudinal members, which are spaced apart from each other in vehicle transverse direction and are connected with each other via at least one cross member, wherein the subframe has a stiffening structure for increasing the torsion stiffness, with a charging module for contactless energy transfer being integrated in the stiffening structure, and wherein the charging module is connected with the stiffening structure exclusively via decoupling bearings.

Because the charging module is connected with the stiffening structure exclusively via decoupling bearings the charging module can be constructed comparatively easily while still being effectively decoupled from the torsion of the stiffening structure by the decoupling bearings. The charging module is to be understood as a vehicle-side part of a system for contactless energy transfer as exemplarily disclosed in the patent documents DE 10 2010 0452 395 A1 and EP 0 253 345 B1. Hereby the electrical energy is transferred (inductively) from a preferably stationary arranged transmitter to the charging module mounted on the vehicle for further use. For increasing efficiency the charging module and the transmitter have to be positioned as close to each other as possible. Therefore is desirable to position the (plate shaped) charging module low on the vehicle. The stiffening structure can be configured as a shear resistant plate or as a strut assembly, preferably of cross type construction (so called strut cross). As a result of the shear resistant plate only the stiffness of the subframe can be increased, while the strut assembly is additionally capable of absorbing forces. The longitudinal members of the subframe are preferably arranged mirror symmetrical and can be connected either directly or indirectly, for example via a cast joint, with the at least one cross member to form an open or closed frame construction.

In a preferred embodiment the decoupling bearings are configured as rubber-metal-sleeve bearings. The stable outer metal sleeve ensures a tight fit in the stiffening structure or the bearing module, while the inner sleeve for receiving a connection element is vibration decoupled by an elastic intermediate layer.

In a preferred embodiment the charging module has a shielding plate and a coil unit, wherein the coil unit is arranged geodetically below the shielding plate. For a better functioning of the coil unit a shielding against the surrounding ferromagnetic components (for example longitudinal member, cross member and stiffening structure) is required. For this purpose the oil unit is partially encased by a shielding plate, which is preferably made of aluminum, i.e., in such a manner that the shielding plate is situated between the ferromagnetic components and the coil unit. The coil unit is at least partially permeated during operation by a magnetic alternating field of the (geo-stationary) transmitter, whereby a voltage is induced. An appropriate power electronics converts this voltage and transmits it to the onboard network of the motor vehicle.

In a preferred embodiment the shielding plate is connected with the stiffening structure via the decoupling bearings. The shielding plate is comparatively stable and as such can thus best support the charging module on the stiffening structure.

In a preferred embodiment the decoupling bearings are joined with the stiffening structure and hold the charging module via connection elements. The connection elements can for example be screw-thread combinations. The stiffening structure holds the decoupling bearings preferably by a press fit.

In a preferred embodiment the decoupling bearings are pressed into corresponding receptacles of the stiffening structure. Particularly preferably the receptacles are configured as metal sleeves that are fastened in the stiffening structure by material bonding with the decoupling bearings being pressed into the metal sleeves.

In a preferred embodiment the decoupling bearings are joined with the charging module and are supported on the stiffening structure via connection elements. The connection elements can for example be screw-thread combinations. The charging module holds the decoupling bearings by a press fit.

In a motor vehicle with a subframe according to the invention the charging module is connected with an electrical energy storage. In a preferred embodiment the energy storage is configured as a traction battery. When the motor vehicle is moved over a geo-stationary transmitter on the road the coil unit of the charging module in the stiffening structure of the subframe receives the magnetic alternating field transmitted by the transmitter and a voltage is induced. The power electronics transfers the voltage to the traction battery, which is thereby charged. For propulsion of the motor vehicle the voltage can later be withdrawn again from the traction battery in order to drive an E-machine.

BRIEF DESCRIPTION OF THE DRAWING

Further details and advantages of the invention will become apparent from the following description of a preferred exemplary embodiment with reference to the drawings.

Herein it is shown in.

DETAILED DESCRIPTION OF PREFERRED EMBODIMENTS

Figure 1:
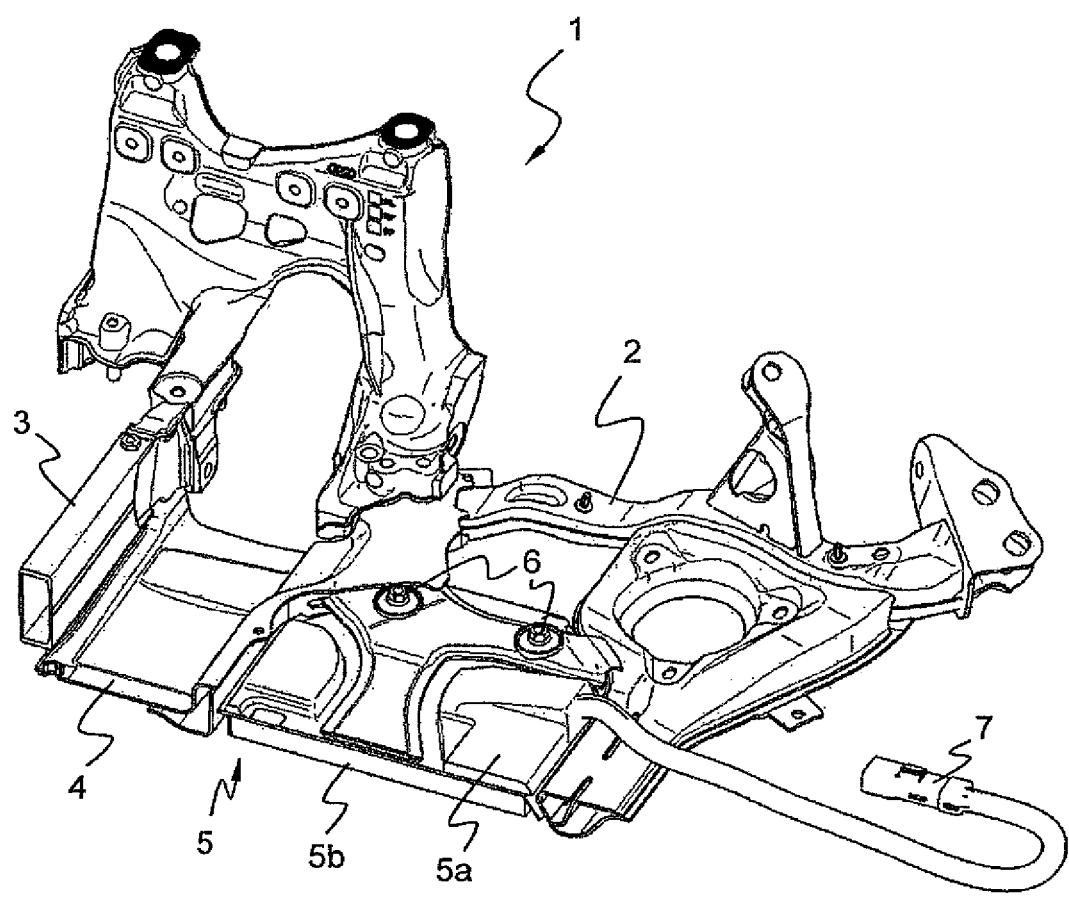
FIG. 1 a lateral sectional view of a first embodiment of the subframe.
Figure 2:
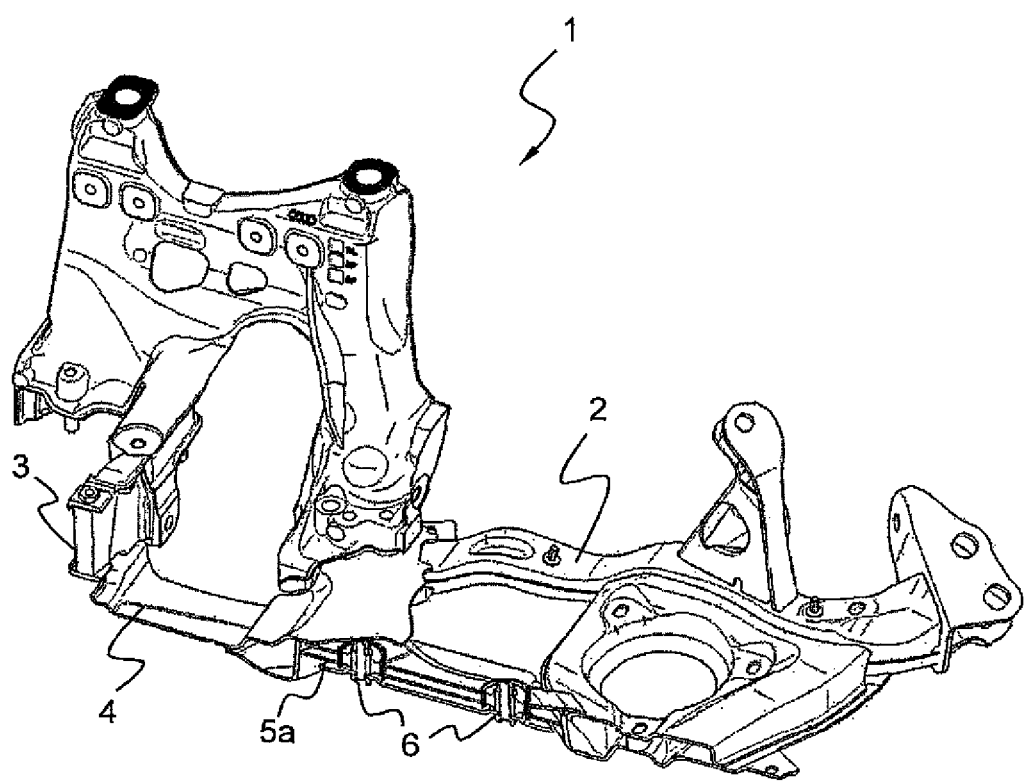
FIG. 2 a further lateral sectional view of the first embodiment of the subframe.

According to FIGS. 1 and 2 a subframe for the front region of a motor vehicle is made of two longitudinal members 2, which are arranged mirror symmetric with respect to the vehicle longitudinal axis and are spaced apart from each other (in the present sectional view only one longitudinal member is shown), and which are connected with each other by a cross member 3. On the thusly formed subframe 1 a stiffening structure 4, presently configured as a strut cross, is arranged for increasing the torsion stiffness. In its center the stiffening structure 4 has free surfaces. There, a charging module 5 is inserted which is made of a shielding plate 5a and a coil unit 5b. In the installed state the shielding plate 5a covers the coil unit 5b upwards. The shielding plate 5a, which is preferably made of aluminum, is at its borders screwed to decoupling bearings 6, which are in turn fixedly held in the stiffening structure 4. The decoupling bearings 6 decouple the charging module 5 from the deformations of the stiffening plate 4 during driving operation. The decoupling bearings 6 are configured as rubber-metal-sleeve bearings and are form fittingly pressed into corresponding sleeve-shaped receptacles of the stiffening structure 4. A plug 7 leads from the coil unit 5b to an energy storage unit (not shown) of the vehicle.

Figure 3:
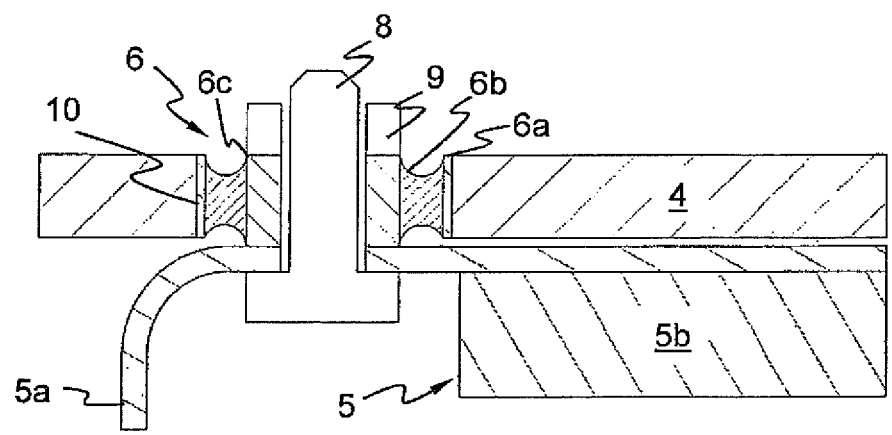
FIG. 3 a sectional view through a decoupling bearing of the first embodiment of the subframe.

FIG. 3 shows a decoupling bearing 6 according to the embodiment shown in FIGS. 1 and 2 as a rubber-metal-sleeve bearing with an outer sleeve 6a, which is pressed into a receptacle 10 of the stiffening structure 4. By means of a circumferential elastomer layer 6b an inner sleeve 6c is elastically held on the outer sleeve 6a, wherein the inner sleeve 6c further has a nut 9. The nut 9 has an inner thread, which can interact with an outer thread of a connection element 8, which is configured as a screw. The shielding plate 5a of the charging module 5 is held via the connection element 8, which charging module in turn holds the coil unit 5b.

Figure 4:
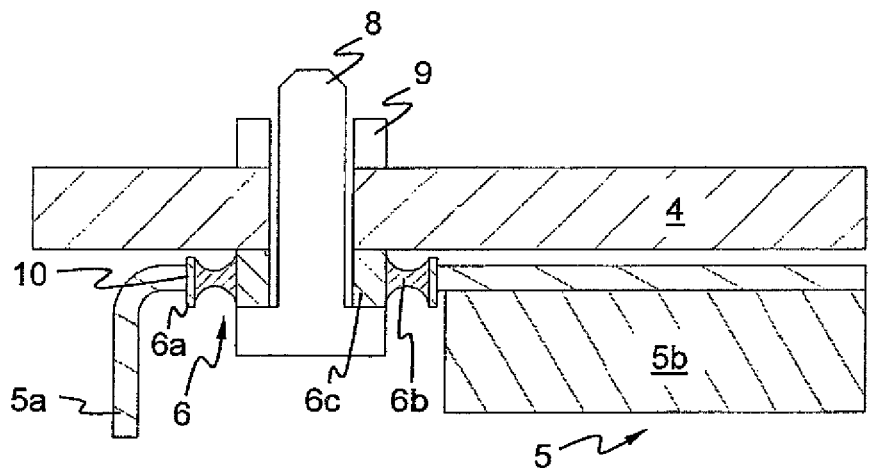
FIG. 4 a sectional view through a decoupling bearing of a second embodiment of the subframe.

FIG. 4 shows a decoupling bearing 6 according to a second embodiment, which can analogously be used in a subframe of FIGS. 1 and 2. The decoupling bearing 6 is a rubber-metal-sleeve bearing with an outer sleeve 6a, which is pressed into a receptacle 10 of the shielding plate 5a of the charging module 5. By means of the circumferentially extending elastomer layer 6b an inner sleeve 6c is elastically held on the outer sleeve 6a. The stiffening structure 4 carries a nut 9 with an internal thread. A connection element 8, which is configured as a screw, has an outer thread, which can interact with the inner thread of the nut 9. Thus via the decoupling bearing 6 the shielding plate 5a is fastened on the stiffening structure 4 in an elastically decoupled manner, wherein the shielding plate 5a holds the coil unit 5b.

What is claimed is:

1. A subframe of a front or rear region of a motor vehicle, comprising:
    two longitudinal members which are spaced apart from each other in a transverse direction of the motor vehicle and are connected with each other via at least one cross member;
    a stiffening structure for increasing a torsion stiffness of the subframe; and
    a charging module for contactless energy transfer said charging module being integrated in the stiffening structure, and connected with the stiffening structure exclusively via decoupling bearings.

2. The subframe of claim 1, wherein the decoupling bearings are configured as rubber-metal-sleeve bearings.

3. The subframe of claim 1, wherein the charging module has a shielding plate and a coil unit, and wherein in an installed state the coil unit is geodetically arranged below the shielding plate.

4. The subframe of claim 3, wherein the shielding plate is connected with the stiffening structure via the decoupling bearings.

5. The subframe of claim 1, wherein the decoupling bearings are joined with the stiffening structure and hold the charging module via connection elements.

6. The subframe of claim 5, wherein the decoupling bearings are pressed into corresponding receptacles of the stiffening structure.

7. The subframe of claim 1, wherein the decoupling bearings are joined with the charging module and are supported on the stiffening structure via connection elements.

* * * * *